US011451540B2

(12) United States Patent
Hooley

(10) Patent No.: US 11,451,540 B2
(45) Date of Patent: Sep. 20, 2022

(54) METHOD OF AUTHENTICATION

(71) Applicant: SMARTGLYPH LIMITED, West Yorkshire (GB)

(72) Inventor: Martin Hooley, West Yorkshire (GB)

(73) Assignee: SMARTGLYPH LIMITED, West Yorkshire (GB)

(*) Notice: Subject to any disclaimer, the term of this patent is extended or adjusted under 35 U.S.C. 154(b) by 561 days.

(21) Appl. No.: 15/309,854

(22) PCT Filed: May 8, 2015

(86) PCT No.: PCT/GB2015/051363
§ 371 (c)(1),
(2) Date: Nov. 9, 2016

(87) PCT Pub. No.: WO2015/170118
PCT Pub. Date: Nov. 12, 2015

(65) Prior Publication Data
US 2017/0155646 A1    Jun. 1, 2017

(30) Foreign Application Priority Data

May 9, 2014   (GB) ................................. 1408256

(51) Int. Cl.
G06K 19/06       (2006.01)
H04L 9/40        (2022.01)
(Continued)

(52) U.S. Cl.
CPC ........ H04L 63/0876 (2013.01); G06K 7/1095 (2013.01); G06K 19/06037 (2013.01);
(Continued)

(58) Field of Classification Search
USPC ...................................................... 726/1–25
See application file for complete search history.

(56) References Cited

U.S. PATENT DOCUMENTS 7,665,127 B1 *  2/2010  Rao .................. G06F 21/335
                                                726/20
8,627,438 B1 *  1/2014  Bhimanaik ........... H04L 63/08
                                                726/9
(Continued)

OTHER PUBLICATIONS

Kikuchi et al.; "A New Color QR Code Forward Compatible with the Standard QR Code Decoder"; 2013 International Symposium on Intelligent Signal Processing and Communication Systems, IEEE, Nov. 12, 2013, pp. 26-31.

(Continued)

Primary Examiner — Chrystina E Zelaskiewicz
(74) Attorney, Agent, or Firm — Renner, Otto, Boisselle & Sklar, LLP

(57) ABSTRACT

A method, of authenticating a user with a service and a server having means to enable a user to be authenticated with a service. The method having the steps of, the user requesting a session with the service on a first device. The server requesting a unique code from a host server, the host server generating the unique code, associating it with a session-identifier. The session-identifier containing information relating to the code request. The host server then sending the unique code, which does not contain the session-identifier, to the service. The server then optically presents the unique code to the user on a display of the first device. The code is then acquired by a verification application running on a second device. Optionally the first device and the second device may be the same device. The second device is previously registered with the host server. The verification application sends the unique code, and device-identifying information of the second device, to the host server. The host server, on receiving the unique code and device-identifying information, uses the unique code to retrieve the session-identifier, and uses the device-identifying information to retrieve associated user-identifying infor- (Continued)

mation. This user-identifying information is stored on the host server. The host server then sends the user-identifying information to the service.

19 Claims, 7 Drawing Sheets

(51) Int. Cl.
  *G06K 7/10* (2006.01)
  *G06Q 20/08* (2012.01)
  *G06Q 20/12* (2012.01)
  *G06Q 20/32* (2012.01)
  *G06Q 20/40* (2012.01)
  *G06Q 30/06* (2012.01)
  *H04W 12/77* (2021.01)

(52) U.S. Cl.
  CPC ..... *G06K 19/06093* (2013.01); *G06Q 20/085* (2013.01); *G06Q 20/12* (2013.01); *G06Q 20/3276* (2013.01); *G06Q 20/40* (2013.01); *G06Q 30/0635* (2013.01); *H04L 63/083* (2013.01); *H04L 63/0853* (2013.01); *G06K 2007/10524* (2013.01); *H04L 2463/121* (2013.01); *H04W 12/77* (2021.01)

(56) References Cited

U.S. PATENT DOCUMENTS

| | | | | |
|---|---|---|---|---|
| 9,760,871 | B1* | 9/2017 | Pourfallah | G06Q 20/102 |
| 2009/0193507 | A1* | 7/2009 | Ibrahim | H04L 63/0807 |
| | | | | 726/9 |
| 2012/0054841 | A1* | 3/2012 | Schultz | G06F 21/51 |
| | | | | 726/22 |
| 2012/0150750 | A1* | 6/2012 | Law | H04L 63/0876 |
| | | | | 705/76 |
| 2013/0219479 | A1* | 8/2013 | DeSoto | H04W 12/06 |
| | | | | 726/6 |
| 2014/0040628 | A1 | 2/2014 | Fort et al. | |
| 2014/0223185 | A1* | 8/2014 | Bender | H04L 9/3247 |
| | | | | 713/176 |
| 2015/0058949 | A1* | 2/2015 | Collinge | G06F 21/44 |
| | | | | 726/7 |
| 2016/0344604 | A1* | 11/2016 | Raleigh | G06F 9/54 |

OTHER PUBLICATIONS

Parikh et al.; Localization and Segmentation of A 2D High Capacity Color Barcode; Applications of Computer Vision, 2008, WACV 2008, IEEE Workshop On, IEEE, Piscataway, NJ, USA, Jan. 7, 2008, pp. 1-6.

Grillo et al.; "High Capacity Colored Two Dimensional Codes"; Computer Science and Information Technology (IMCSIT), Proceedings of The 2010 International Multiconference On, IEEE, Piscataway, NJ, USA, Oct. 18, 2010, pp. 709-716.

International Search Report and Written Opinion for corresponding Patent Application No. PCT/GB2015/051363 dated Jul. 28, 2015.

* cited by examiner

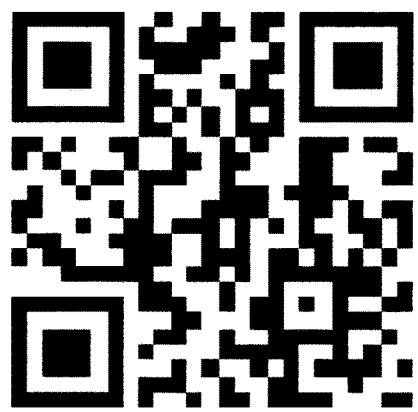
Fig. 5
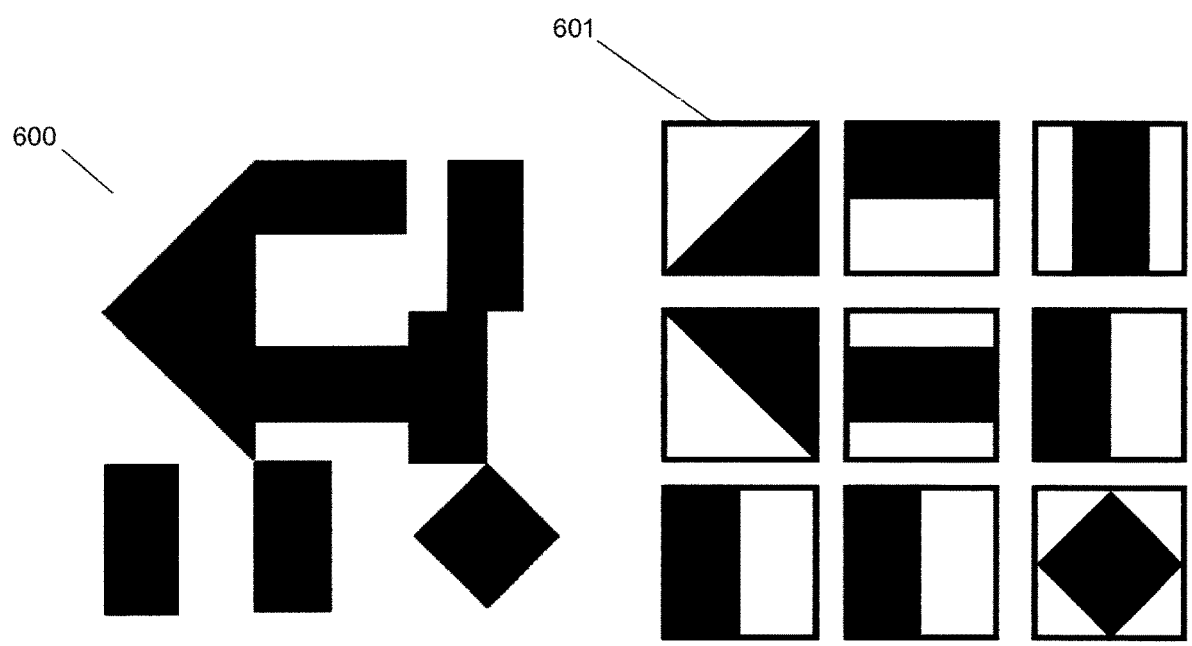
Fig. 6-a
Fig. 6-b

Fig. 7
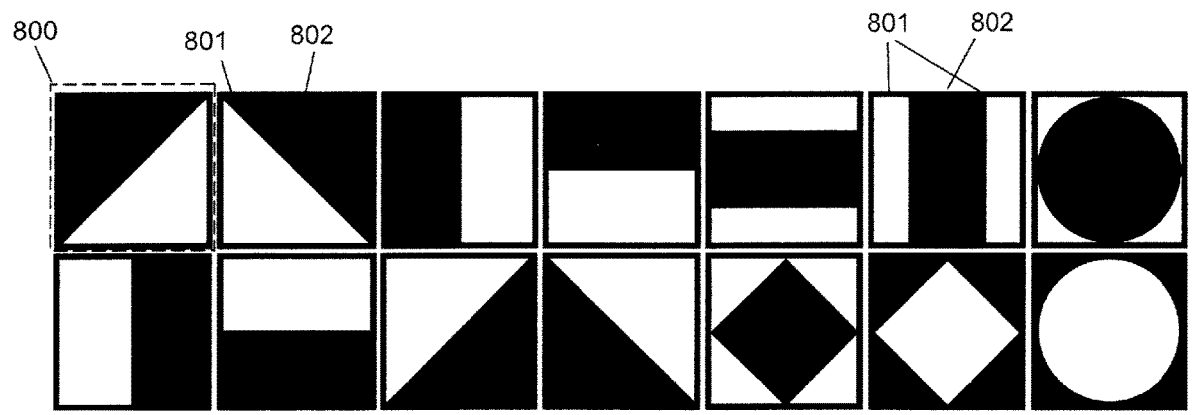
Fig. 8-a
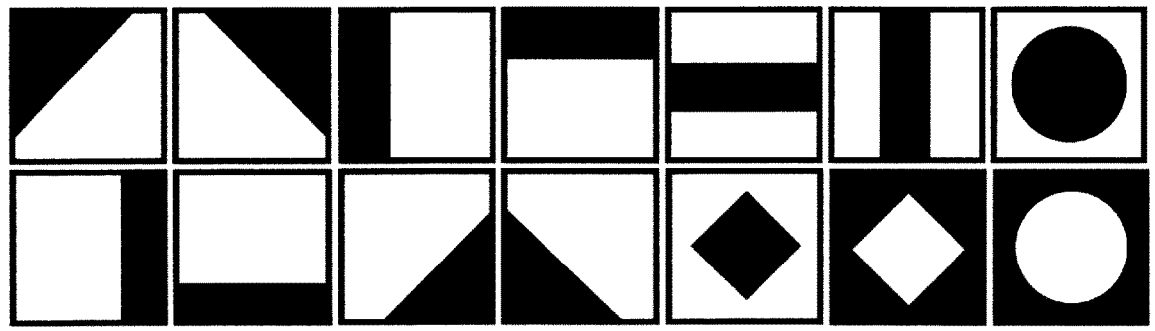
Fig. 8-b
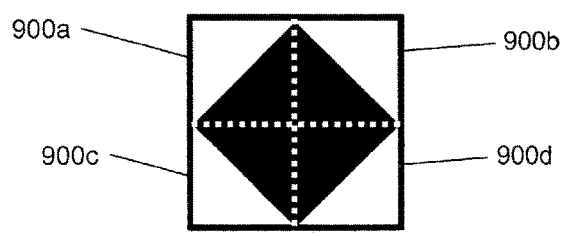
Fig. 9

METHOD OF AUTHENTICATION

This application is a national phase of International Application No. PCT/GB2015/051363 filed May 8, 2015 and published in the English language, which claims priority to United Kingdom Patent Application No. 1408256.4 filed May 9, 2014, which are hereby incorporated herein by reference in their entirety.

The present invention relates to authenticating users with a service.

The field of authentication is dominated by the standard password, an identifier known only to the user and the service, used to authenticate the user. However, passwords are prone to a number of interception techniques, and in addition are liable to be forgotten. Examples of interception techniques include RAM scraping, keystroke logging, etc. Further, as modern devices become smaller, input on said devices is increasingly difficult due to the reduced space available for input. As a result, user passwords have decreased in length and therefore in security.

The present invention aims to provide a quicker and/or more secure method of authenticating a user.

The present invention has been described with reference to embodiments; modifications of these embodiments, further embodiments and modifications thereof will be apparent to the skilled person and as such are within the scope of the invention.

In its most general form, the present invention provides a method for authenticating a user with a service, through presenting the user with a unique code, the user acquiring the code on a known device, the known device forwarding the unique code to a third party service with which the device is known, the third party service verifying with the service the identity of the user.

Accordingly, in a first aspect, the present invention provides a method for authenticating a user with a service, having the steps of:
  the user requesting a session with the service on a first device;
    the service requesting a unique code from a host server;
    the host server generating the unique code, associating it with a session-identifier, the session-identifier containing information relating to the code request, the host server then sending the unique code, which does not contain the session-identifier, to the service;
    the service optically presenting the unique code to the user on a display of the first device;
    acquiring the unique code by a verification application running on a second device, wherein the first and second device may optionally be the same device;
the second device being previously registered with the host server;
  the verification application sending the unique code and device-identifying information of the second device, to the host server;
  the host server, on receiving the unique code and device-identifying information from the second device, using the unique code to retrieve the session identifier, and using the device-identifying information to retrieve associated user-identifying information stored on the host server;
  the host server sending user-identifying information to the service.

The unique code as discussed above does not contain the session-identifier. Preferably, it contains no information which when taken in isolation has meaning. In an embodiment the code is used as an index to lookup data on an internal database. As such, the code could be any imaginable form of data, however as the skilled person will appreciate, such data is generally numerical in form.

The advantages provided by such a method are clear. In comparison to the prior art, the method of authentication provided by the present invention removes the requirement for a user to manually enter data, thus a number of interception methods are rendered useless.

In some embodiments, the session-identifier contains information identifying the service which requested the unique code. This information could be any one of, name of the service, timestamp of the request, shared authentication information, etc. The skilled person will appreciate that varying types of information could be used for identifying a service to the host server. In a further embodiment similar to the previous, the session-identifier additionally contains information identifying the request for a session with the service. This information could be any one of, IP address of the user requesting the service, hardware identifying information related to the user requested the service, known authentication information etc. Again, the skilled person will appreciate that varying types of information could be used to identify the user requesting a session.

In an embodiment, if the user is previously known to the service, authenticating the user and granted the session on the first device. In this context, known indicates that the user is registered locally to the service, i.e. the user has a local login account.

In an embodiment of the present invention, user-identifying information associated with the device may include, a username, a password, a date of birth, an address, a telephone number, a host server specific username, a host server specific password, a service specific username, a service specific password. The skilled person will of course appreciate that other user-identifying information could be used as appropriate.

In some embodiments, if the user is not previously known to the service, the service requesting additional user-identifying information from the host server which is then provided by the host server to the service. In this context, not previously known indicates that the user has either not used the service before, or does not have a local login account for the service. In a similar embodiment, the service then utilizes the additional user-identifying information to register the user with the service. Thus the user is now known locally to the service for future session requests. In all embodiments of this paragraph, the additional user-identifying information may be selected by the user in that the user may indicate preferences stored on the host server which indicates what user-identifying information may be shared.

In an embodiment, the unique code may be a unique locator code. In this context locator code indicates the code is utilized to locate data in a database, i.e. it is an index value for a lookup table. Thus the unique code when viewed externally to the host server contains no data which in isolation is useful. The unique code must be used on the host server to retrieve stored information.

In some embodiments, the device-identifying information may be a unique code in the same format as the unique code requested by the service. It may be a reference value to data stored externally to the code. In some embodiments, the device-identifying information may contain a MAC address of the device, or similar hardware identifying information. The skilled person will appreciate what information may be used to uniquely identify a device i.e. BIOS identifiers etc.

In an embodiment, the user requests a session with the service by navigating to a webpage of the service on the first device. In this embodiment, a user utilizing HTTP or a similar web protocol accesses a stored webpage on the service, to login to the service. The skilled person will appreciate that this can take many forms, a "login" button presented to the user or similar.

In some embodiments, the second device is known to the host server in that a MAC address or similar device-identifying information is stored on the host server, the device-identifying information being associated with user-identifying information.

In an embodiment, the session-identifier remains local to the host server's network at all times. In other words, the session-identifier is not transmitted in any form externally to the host server.

In some embodiments, the first device and the second device are the same device. This is illustrated well in FIG. 4. In a similar embodiment, the unique code is presented to the user on a screen of the device. In an example where the device is a smartphone, the unique code is presented to the user on the screen of the smartphone device. In all embodiments of this paragraph, acquisition of the unique code is initiated through the user selecting the code on the screen of the device. In the example where the device is a smartphone with a touch screen, the user would "click" on the unique code as presented on the screen of the device.

In an embodiment, the first and second device are not a single device. This is illustrated well in FIG. 3. In a similar embodiment, acquisition of the unique code is initiated by the user through use of a camera on the second device to optically capture the code. In an example, a desktop computer is the first device, and a smartphone the second device. The unique code is presented on a display of the first device, and then acquired by the camera of the second device.

In some embodiments, the method of authenticating the user is used prior to using a method of authorizing a transaction. In a similar embodiment, the method of authorizing the transaction has the steps of:

the user, being authenticated with the server, requesting to authorize a transaction associated with a service;

the service opening a communications channel with a payment merchant, the service then transferring details of the users transaction to the payment merchant;

the payment merchant opening a communications channel with the host server and sending the details of the users transaction to the host server;

the host server opening a communications channel with the second device, and sending the details of the users transactions to the device;

the user verifying that the details of the transaction are accurate, authorizing the transaction on the second device;

the second device sending the authorization to the host server;

the host server sending the authorization to the payment merchant;

the payment merchant authorizing the transaction.

In a similar embodiment, the details of the transaction may include at least one of, a total basket amount, a listing of items to be purchased, a date and time stamp for the transaction. The skilled person will appreciate that any transaction identifying information may be used.

In an embodiment, the unique code is formed of an array of equal-area elements, each element being the smallest representation of a data value, wherein each element is one of the following types of element:

a first type wherein the entire area of the element is a single colour;

a second type wherein the area is divided into at least two portions, each portion being a respective colour, wherein the array has at least one of the second type of element.

The advantages provided by such a code are clear. In comparison to the prior art, the optical code of the present invention provides a substantially easier and consistent read by a scanning device, due to the contrast provided by such divisions of elements.

In an embodiment of the present invention, the respective colours of the second type of element are different colours. For example, a first colour may be black, and a second colour white, or a first colour may be red, and a second colour blue.

In an embodiment of the invention, there may exist a ratio between the area of the element and an area of the first of the at least two portions being greater than 0 and less than 1, alternatively the ratio may exist being greater than 0.1 and less than 0.9, alternatively the ratio may exist being greater than 0.2 and less than 0.8, alternatively the ratio may exist being greater than 0.3 and less than 0.7, alternatively the ratio may exist being greater than 0.4 and less than 0.6, or alternatively the ratio may exist as 0.5.

In an embodiment of the invention, the division of the second type of element may be such that there exists an average pixel value being between greater than 0 and less than 1. In this context, an average pixel is the averaged value of pixels representing an optically captured element.

An example of an average value used is a greyscale value; notionally the value 1 is assigned to 100% white, and 0 is assigned for 100% black. Thus the varying degrees of grey can be identified through reference to a number between 0 and 1. In this example, if the element is an element of the second type, and the first colour is white (pixel value 1) and the second colour is black (pixel value 0), in an example where the element is divided into two equal portions the average pixel value would be 0.5. Similarly, if the element was divided into a portion being ¼ and a portion being ¾, the average pixel value would be ¾.

In an alternative example, pre-processing may be used to give a best case for comparison. In this example, associated error bars are used to identify which pixels may be considered white, for example pixels between 0.9 and 1.0 may be considered white (value 1) and any pixels between 0 and 0.9 may be considered black (value 0). By doing this, errors that may be introduced during read are negated (grey values are considered black etc.) and a best case is presented for validation. To give an example in 8-bit colour values, any pixel with a value less than or equal to 200,200,200 may be considered black by the scanning device and any pixel with a value greater than 200,200,200 may be considered white by the scanning device.

Validation may then proceed through fuzzy image comparison, utilizing known methods to compare the un-validated element to known elements stored in the scanning device. Such methods generally return a % likeliness value, which can be compared to a control value. For example, it may be that the scanning device accepts 60% alike as a valid element. Thus if the pre-processed element is more than 60% alike to a known stored element, the un-validated element is considered validated. Alternatively if the pre-processed element is less than 60% alike, the scanning device will reject the element, and may request the user to re-capture the element so as to retry validation. This percentage likeliness can of course be represented as a decimal, and so may be an average pixel value as described above.

Alternatively, as an example, 8-bit colour values may be used (i.e. RRR,GGG,BBB). In this example, black has the value 0,0,0 and white 255,255,255. In this example, for an element of the second type, divided in two, the average value would be 128,128,128. Further this value can be normalised: Value/Maximum Value≈Normalised average value or 128/25≈0.5; thus the average value as discussed previously is given. Broadly, the average pixel value is analogous to the ratio as discussed previously.

A person skilled in the art will appreciate that values given in the above are for illustrative purposes and may be decided based on a plurality of factors.

In the same or any other embodiment of the invention, the area may be divided such that at least one portion forms a simple shape. The simple shape may be selected from the group consisting of: triangles, squares, rhombuses, rectangles etc. A person skilled in the art will appreciate that any simple shape may be used, such as demonstrated in FIG. 8.

In a further embodiment of the present invention, the element is split such as to form two equally sized portions, i.e. the element is 50% one colour and 50% a colour different to the first.

In yet the same or any other embodiment of the invention, the element may be divided such as to possess at least one degree of symmetry; alternatively the element may be divided such as to possess at least two degrees of symmetry; alternatively the element may be divided such as to possess at least three degrees of symmetry. A degree of symmetry may be one or more of rotational, reflectional or translational.

In yet the same or any other embodiment of the invention, the element may be divided such as to give a marked contrast between respective portions. A person skilled in the art would appreciate that clearly a division wherein a negligible second portion is produced would not meet the criteria that there is a marked contrast. Further the contrast required may be determined by the resolution of the device which is to be used to scan the code. In a similar embodiment, a contrast is given by having adjacent portions having non-complimentary colours.

In an embodiment of the invention, the first respective colour of the second type of element is black and the second respective colour of the same type of element is white.

In an embodiment of the present invention, the data stored within the code is not active data. This allows the code to be displayed in a significantly reduced footprint, whilst maintaining a high degree of storage. In a further embodiment of the present invention, the data stored within the code is non-binary in format. Further, the removal of active data (data which in isolation has meaning) allows the code of the present invention to effectively contain near unlimited amounts of data through referencing to a central server. In comparison, QR codes of the prior art are limited in the amount of data which they can contain.

In an embodiment of the present invention, 13 unique elements are utilized, wherein 12 of the 13 unique elements are approximately 50% one colour and 50% a colour different to the first.

In an embodiment of the present invention, the division may be such as to split the element into at least two equally sized portions. In a similar embodiment, a portion may be considered to be a plurality of non-contiguous sub-portions each being a same colour. In other words, a portion may be considered to be all of the parts of an element being the same colour. In a similar embodiment, a portion may additionally be considered to be a contiguous portion being a same colour.

In an embodiment of the present invention, elements of the second type may be divided into segments, wherein each segment has properties matching at least one type of element. In other words, a segment of an element may have any of the properties as discussed previously. For example, the segment may be divided such as to have a ratio between the initial segment area and a divided segment area being greater than 0 but less than 1.

In an embodiment of the present invention, the array is an n×m array. In a similar embodiment, neither n nor m is equal to 0 or 1. In a similar embodiment, n is equal to m such as to form a square array.

In its most general the present invention also provides as server capable of authenticating a user to use a service.

Accordingly, in a further aspect, the present invention provides a server having:
  means for communicating with a service, and receiving a request for a unique code from the service, and
  means for generating a unique code, on receipt of the request for the unique code,
  means for associating the unique code with a session-identifier, the session-identifier containing information relating to the code request, the server then sending the unique code, which does not contain the session-identifier, to the service;
  means for communicating with a device, the server receiving the same unique code, and device-identifying information, from the device,
  means for using the unique code to retrieve the session-identifier,
  means for using the device-identifying information to retrieve associated user-identifying information,
  the server then using the session-identifier to send the user-identifying information to the service.

In some embodiments, the session-identifier contains information identifying the service which requested the unique code. This information could be any one of, name of the service, timestamp of the request, shared authentication information, etc. The skilled person will appreciate that varying types of information could be used for identifying a service to the host server. In a further embodiment similar to the previous, the session-identifier additionally contains information identifying the request for a session with the service. This information could be any one of, IP address of the user requesting the service, hardware identifying information related to the user requested the service, known authentication information etc. Again, the skilled person will appreciate that varying types of information could be used to identify the user requesting a session.

In an embodiment of the present invention, user-identifying information associated with the device may include, a username, a password, a date of birth, an address, a telephone number, a host server specific username, a host server specific password, a service specific username, a service specific password. The skilled person will of course appreciate that other user-identifying information could be used as appropriate.

In an embodiment, the unique code may be a unique locator code. In this context locator code indicates the code is utilized to locate data in a database, i.e. is an index value for a lookup table. Thus the unique code when viewed externally to the host server contains no data which in isolation is useful. The unique code must be used on the host server to retrieve stored information.

Embodiments of the present invention will now be described with reference to the accompanying drawings in which:

FIG. 5 shows a planar view of a prior art two dimension optical code

FIG. 6-*a* shows a planar view of an optical code according to an embodiment of the present invention. FIG. 6-*b* shows the same optical code divided into elements.

FIG. 7 shows a planar view of embodiments of elements of the first type according to the present invention.

FIG. 8-*a* and FIG. 8-*b* shows a planar view of embodiments of elements of the second type according to the present invention.

FIG. 9 shows an element according to the present invention divided into portions for identification.

Figure 10:
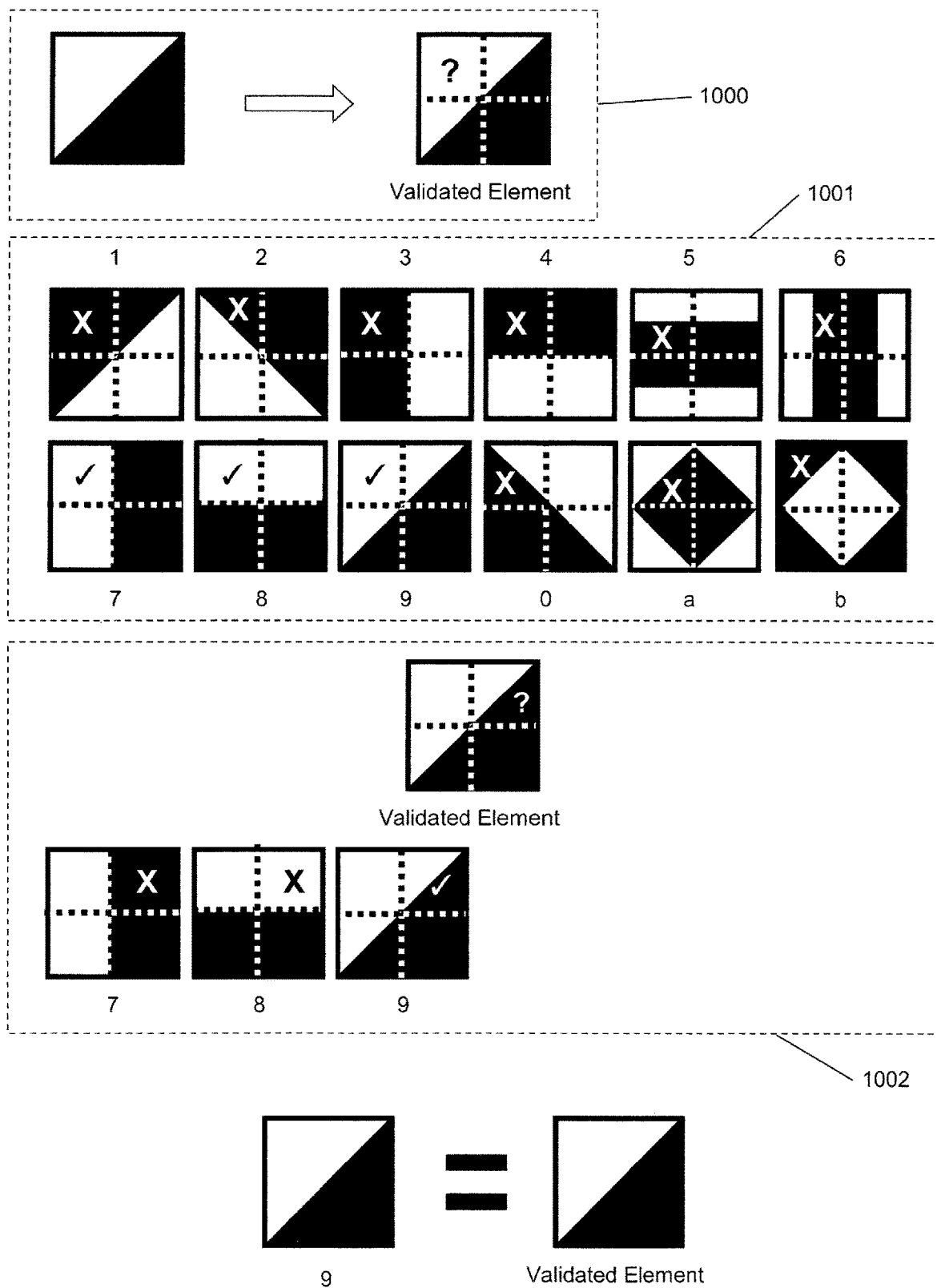

FIG. 10 shows the steps of identifying a validated element.

Figure 11:
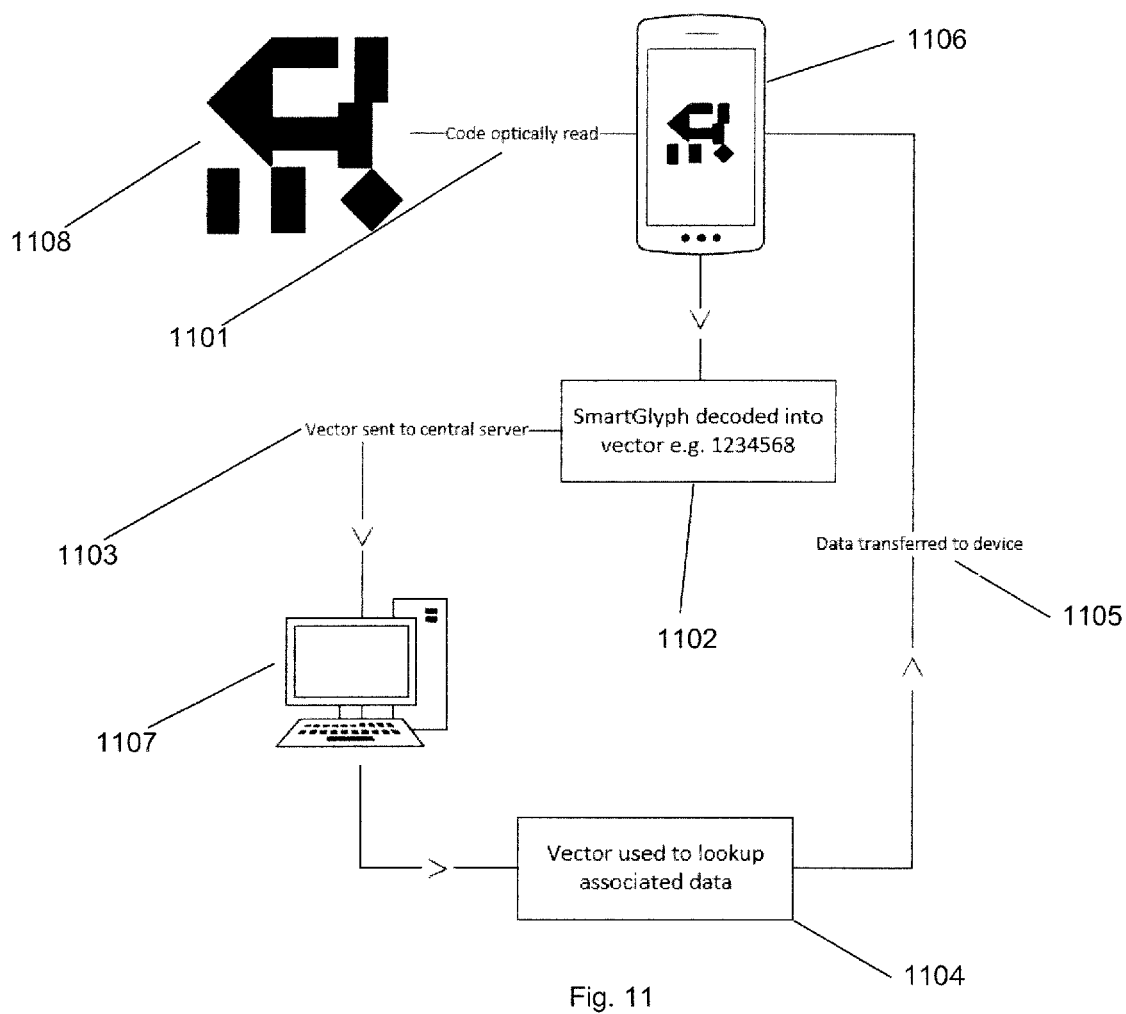

FIG. 11 shows the steps of retrieving associated data by a scanning device.

Figure 1:
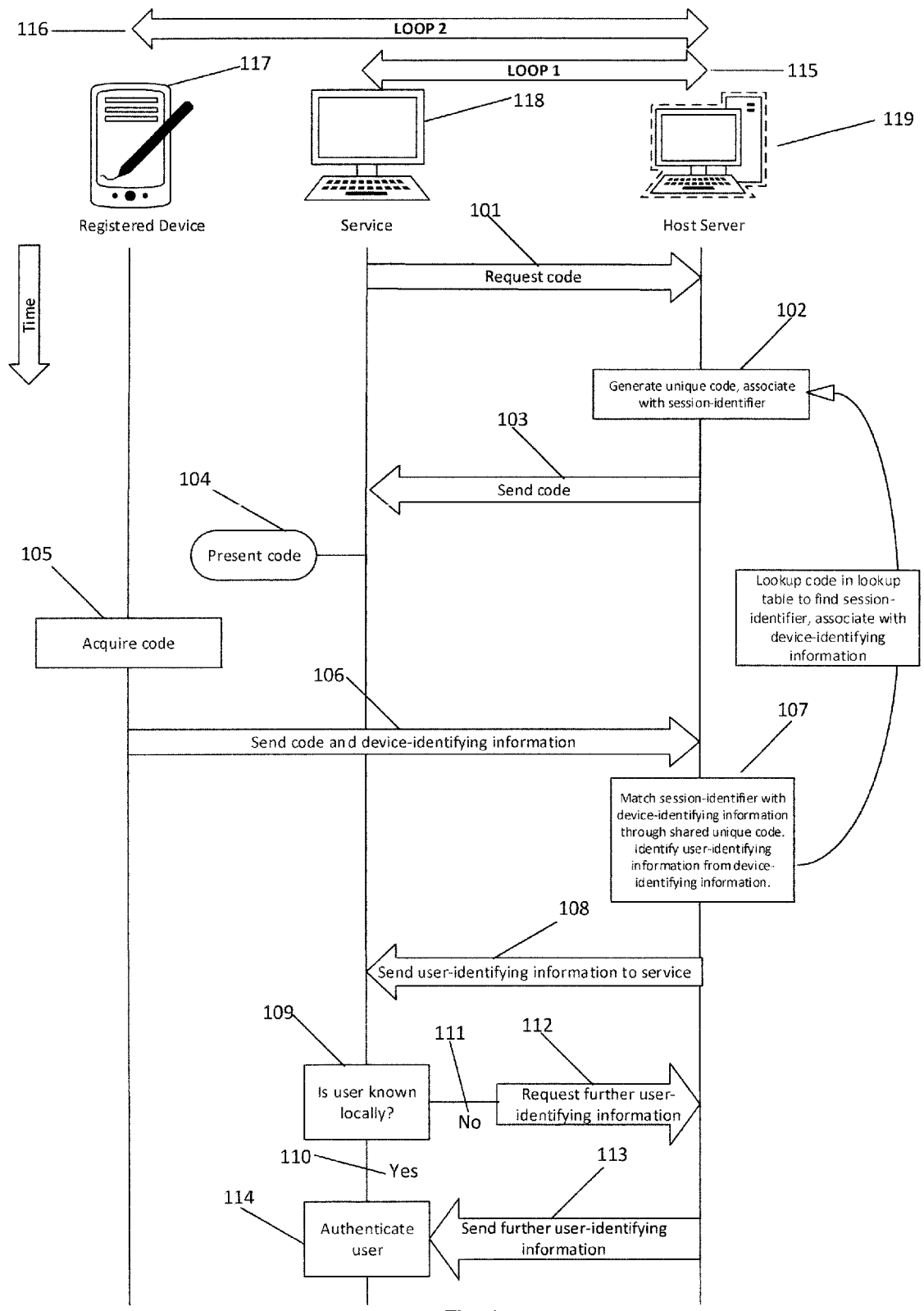
FIG. 1 Shows a communications-flow diagram of an embodiment of the present invention.

FIG. 1 shows the communications flow between devices performing the method of the present invention. Having received the request to authenticate the user, a step 101 is performed wherein the service 118 requests a unique code from the host server 119. The host server 119 then generates a unique code 102 utilizing internal rules. The code is then internally associated with session-identifying information. The session-identifying information is then stored locally, the code is used as an index value for the session-identifying information. The code does not contain information which, externally to the host server, has meaning. By having no meaning, in an example the code contains a number from 0-1000, this number is then used as a reference to lookup data on a secure server. Thus, to any entity outside of the secure server, the data has no meaning. Specifically, the code does not contain the session-identifying information. The code may or may not then be encoded into an encoded format discussed later. The code is then sent 103 to the requesting service 118, the requesting server then presenting 104 the code to the user. The user then inputs 105 the code into a device, herein two implementations are possible.

Figure 3:
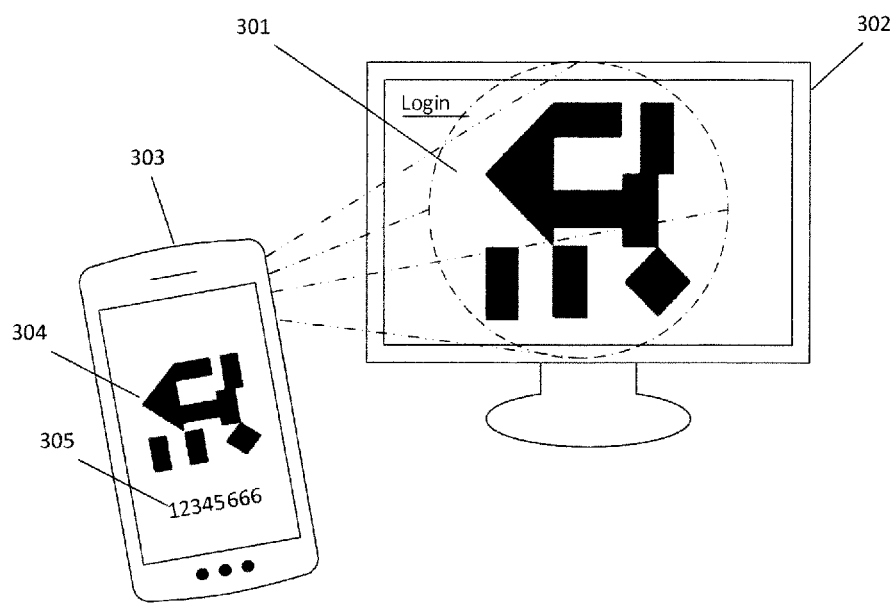
FIG. 3 Shows a schematic of a user utilizing the method of the present invention in the case where the first and second devices are separate devices.

In a first example shown in FIG. 3, the code 301 may be presented on the display of a first device 302, the code 301 is then optically acquired by a second device 303, the second device 303 being known to the host server 119.

Figure 4:
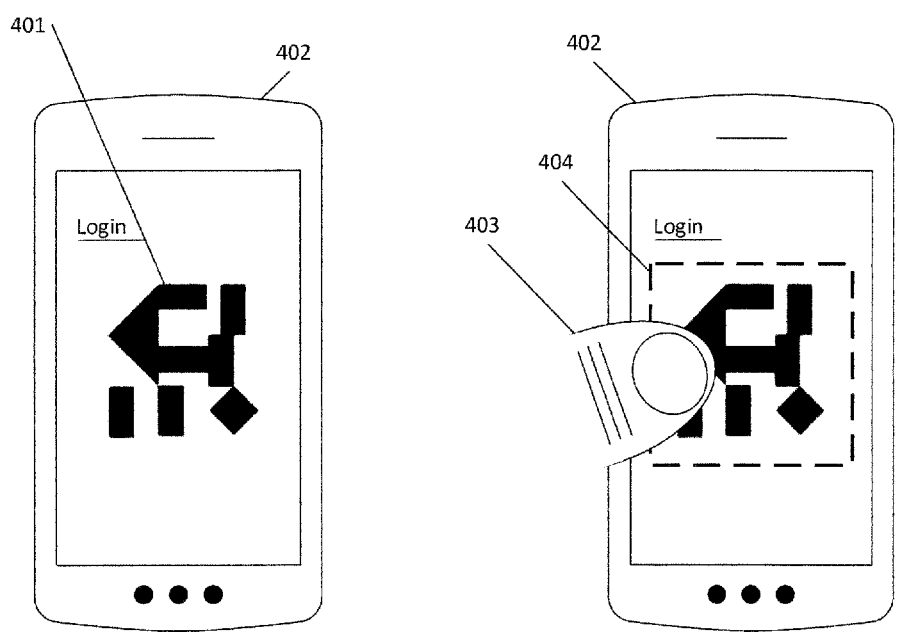
FIG. 4 Shows a schematic of a user utilizing the method of the present invention in the case where the first and second devices are the same device.

In a second example shown in FIG. 4, the code 401 may be presented on the display of a first device 402, the code 401 is then acquired by the same first device 402. This first device being known to the host server 119. In this example, acquiring of the code 401 may be in the form of the user selecting 404 with a cursor 403, or similar, the code 401 as displayed on the first device.

In all examples, device-identifying information is related to the device known to the host server 119. The code then may or may not be transformed from an encoded format into a decoded format, the code in the respective format is then sent 106 to the host server 119 along with device-identifying information. The device-identifying information may by a separate unique code, in a similar format to the first requested unique code. Alternatively, the device-identifying information may be a MAC address or similar hardware-identifying information. The host server 119, having received the unique code and device-identifying information, uses the unique code to internally look-up 107 in a database or similar storage, the associated session identifier. The host server 119 can now associated the device-identifying information with the session-identifying information, further as the device-identifying information is similarly associated with user-identifying information, the host server 119 can now associated the session-identifying information with the user-identifying information. User-identifying information may be any combination of the following: username, password, date of birth, first name, surname, address etc. The skilled person will appreciate that any normal information used to identify a user to a service 118 may be used. The host server 119 will then send 108 the user-identifying information to the service 118, using the session-identifying information to indicate the respective session. Session-identifying information may include any combination of: IP address of the service 118, host name of the service 118, unique identifier of the service 118, a timestamp of the request etc. Again, the skilled person will appreciate that any appropriate identifying information may be used for the session-identifying information.

The service 118, having received the user-identifying information, can now ascertain if the user is known locally 109. Known in this sense is that the user or device has been registered previously with the service 118 or host server 119. If the user is known 110 to the service 118, the service 118 can then retrieve the authentication details (username, password etc.) internally, and authenticate the user 114 to use the service 118. Alternatively, if the user is not known 111 to the service 118, i.e. the user is not registered with the service 118, the service 118 can then request 112 further user-identifying information from the host server 119. The host server 119 then sending 113 this information so as to aid the user in completing registration.

An advantage presented by this method consist in that there exists more than one loop of communication. A loop of communication in this instance is an active channel of communication, via the internet or other appropriate communication channels. Due to this loop, no sensitive information is related between the user on what may or may not be a known device and a service. Loop 1 115 is the communications channel opened between the service and a secure host server, through loop 1 user-identifying information is transferred. Due to static nature of such a connection, secure communication channels can be established to enable the safe transferal of user-identifying information. Loop 2 116 is the communications channel between the user on a known device, and the secure host server. Due to the similar properties as loop 1, this enables secure communication channels to be established.

Figure 2:
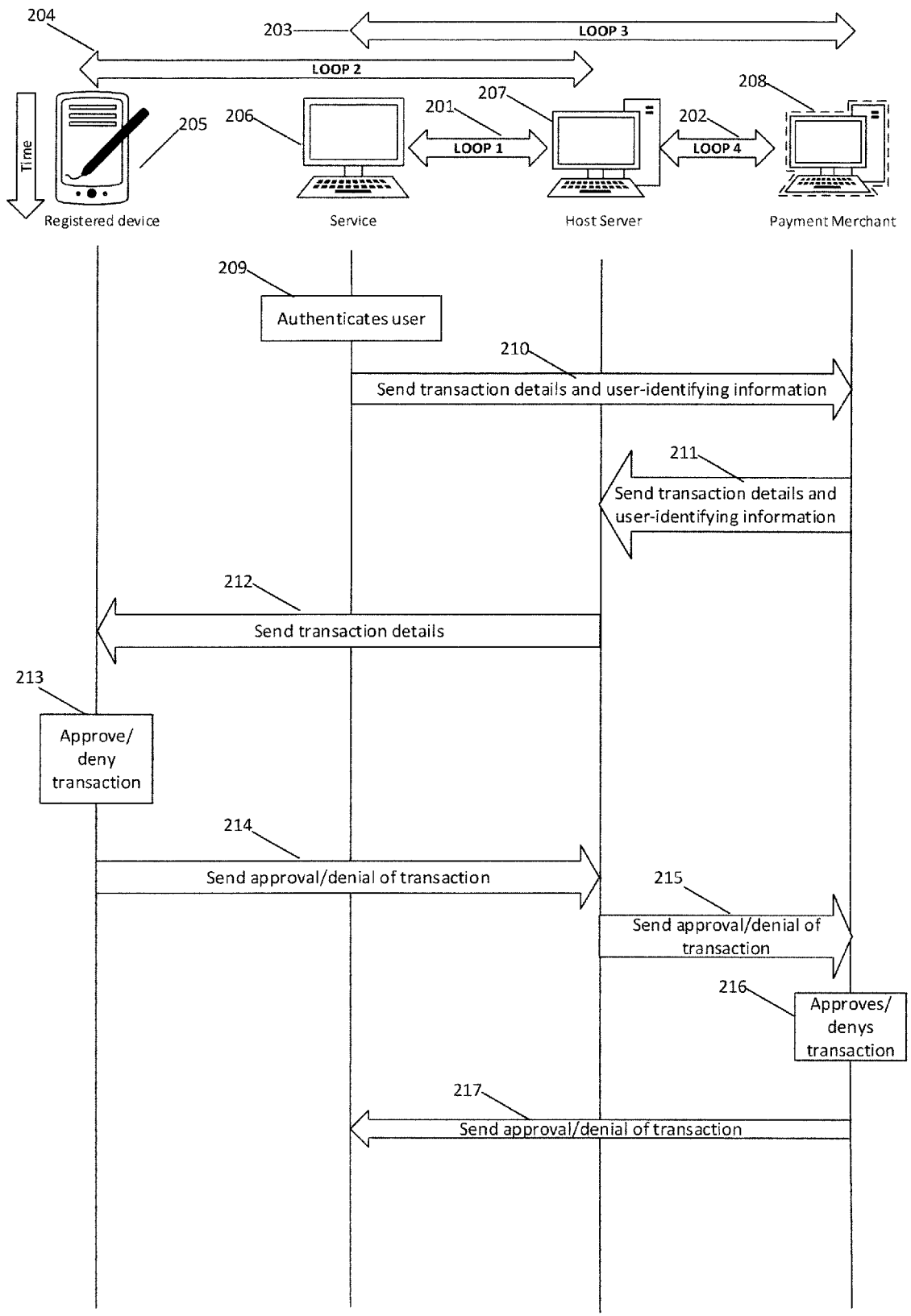
FIG. 2 Shows a communications-flow diagram of an embodiment of the present invention, wherein the method of authentication is used prior to authorizing a transaction.

FIG. 2 shows the communications flow between devices authorizing a transaction. Having authenticated 209 the user in accordance with the method shown in FIG. 1, the service 206 then sends transaction details and user-identifying information 210 to a payment merchant 208 via communications loop 3 203. The payment merchant 208 then sends the transaction details and the user-identifying information 211 to the host server 207 via communications loop 4 202. The host server 207 can then use the user-identifying information to retrieve relevant device-identifying information. The host server 207 can then send the transaction details 212 to the registered device 205 via communications loop 2 204. The user can now approve or deny the payment 213, the user is informed of the transaction details on the registered device 205 and so can verify that the transaction is accurate. In other words, the user, having used the service to prepare a transaction is aware of the correct details for that transaction (total cost, items purchased etc.) and so can verify their accuracy through use of the method. Having authorized the transaction, the registered device 205 communicates to the host server 207 via communications loop 2 204 the approval or denial the transaction 214. Host server 207 then transfers the approval or denial of the transaction 215 to the payment merchant 208 via communications loop 4 202. Payment merchant 208 will then approve or deny the transaction 216 based on at least one of the user's approval or denial and financial information contained in the payment merchant. For example, if the user has approved the transaction however has insufficient funds, the payment merchant will deny the transaction etc. The payment merchant 208 will then inform 217 the service 207 via communications loop 3 203 of the approval or denial of the transaction. The service 207 may then initiate other transaction steps such as requested delivery information etc.

FIG. 5. shows a prior art QR code, elements in the top left, right and bottom left corner represent control blocks for position, data is the encoded in a binary fashion in accordance to the QR code specification as disclosed in the ISO/IEC 18004:2006 specification.

FIG. 6-*a* shows an example of a code in accordance with the present invention. A 3×3 grid 600 formed of 9 elements 601 is shown, wherein the bottom right hand element is an anchor or orientation element. FIG. 6-*b* shows the division of the code into a grid of elements, wherein each element is plainly indicated, the grid lines shown in red are for illustrative purposes and may or may not be present in embodiments of the invention.

FIG. 7 shows elements of the first type according to the present invention, a black border is included for illustrative purposes and may or may not be present in embodiments of the invention.

FIG. 8-*a* shows elements of the second type according to the present invention, a black border is included for illustrative purposes. Each element has at least two portions 800, 801. FIG. 8-*b* again shows elements of the second type according to the present invention, wherein the elements are divided in a manner different to the elements in FIG. 8-*a*, however are still examples according to the present invention.

FIG. 9 shows an element divided into portions 900*a*, 900*b*, 900*c*, 900*d* for identification. The red grid lines are for illustrative purposes, to make clear how the element is divided and may or may not be present in embodiments of the invention.

FIG. 10 shows the steps, 1000, 1001, 1002, of identifying a validated but unidentified element, through dividing the unidentified element into portions, and sequentially comparing the portions to a selection of known elements.

FIG. 11 shows the process of retrieving the active data associated with a SmartGlyph code, through communication between a central server and the scanning device via a network.

Structure of Code:

An embodiment of the present invention may be formed of an array 600 of equal-sized elements 601 in a grid as shown in FIG. 6. The grid may or may not be formed of an n×n or n×m array of elements. A code as shown in FIG. 6 may be referred to as a SmartGlyph.

Each element may represent a single data value, in the examples given the structure is used to encode base 10 numbers i.e. 1, 2, 3 etc.; however the skilled person will appreciate that any form of data can be encoded with the method of the present invention. The element may further represent an indivisible datum, in that the element cannot be divided into further elements containing encoded data.

In some representations of elements, a black border has been added to aid clarity; however this black border may or may not be present in an embodiment of the invention.

A first type of element is shown in FIG. 7, wherein the entirety of the area 700 of the element is a single colour.

Examples of second type of element are shown in FIG. 8, wherein there exists a division of the element 800 area into at least two portions 801, 802, each portion being a respective colour. Subsequent examples indicate that a portion may be a combination of sections of an element, each section being a same colour.

The elements of the second type are divided such as to have strongly contrasting portions; examples shown in FIG. 8-*a* are divided such as to have a 50/50 relation between the portions. The skilled person will of course appreciate that any division yielding a strong contrast can be utilised within the method of the invention. For example elements shown in FIG. 8-*b* are divided differently to those in FIG. 8-*a*, however a clear contrast is still present.

The elements may be divided such that at least one of the portions formed by the division is a simple shape. FIG. 8 demonstrates a selection of the simple shapes used, including circles, rectangles, triangles and rhombuses. The skilled person would appreciate that a number of possible shapes can be used, providing that they are readable by a scanning device.

An element may be used as an anchor and orientation element, in that it is used to define a point of reference on the grid for a scanning device to use. Such anchor elements may or may not be used to encode further data. Further, anchor elements may be placed in a corner of the array, in a preferred embodiment the anchor element is placed in the bottom right corner of the array.

Further, an element may be used as an indication of the type of active data associated with the code, for example an element may be used to indicate that the active data is a video.

Through this type identification, more efficient manipulation of the code can be utilised, allowing the scanning device to be aware of the context in which the active data sits.

Reading of Code:

Due to the advantages of having a second type of element which presents a strongly contrasting image, reading of the code by a scanning device is simplified.

Due to this simplification, it has been shown that any camera with a resolution above 0.3 mega pixel is able to consistently, accurately, and quickly read a SmartGlyph, this being a vast improvement over the prior art.

Elements of a SmartGlyph are identified through a form of discrimination logic, i.e. identifying an element from a store of known elements through identifying which of the known elements the unknown element is not.

Validation

An initial step is the validation that the element to be identified is a valid element within the specification of the SmartGlyph code. Such validation has the following steps:

A scanning device capturing a digital representation of the element to be validated via optical means.

Processors on the scanning device averaging the pixel values of the digital representation of the element.

Comparing the average pixel value of the digital representation to a control value, the control value having associated error margins.

If the average pixel value of the digital representation falls within the range defined by the error margins of the control value, validating the element to then be read as a SmartGlyph code element.

It will of course be appreciated that other means of validation could be performed, such as exposure matching, fuzzy image matching etc.

These validation methods can be performed quickly and inexpensively (with relation to computational time), and show a marked improvement over the validation methods of the prior art which often require heavy computation to calculate checksums etc.

Identification

Having validated the element as fulfilling the requirements of the SmartGlyph technical specification, the element is then identified through the following steps:
  (a) Dividing the validated but unidentified element into a number of segments.
  (b) In a pre-defined manner, sequentially comparing the portions of the divided element to respective segments of known respective elements divided in the same fashion.
  (c) If the segments compared match, retaining the respective elements for the next comparison in the sequence.
  (d) Repeating the steps (b)-(c) until only a single known element remains.
  (e) Identifying the unidentified element as the single remaining known element.

An example of this method is shown in FIG. 10. Step (a) is demonstrated in FIG. 10 by the division of the element into quadrants, it is of course clear that any arbitrary division may take place, so long as such division in consistent with relation to the known elements.

Steps (b)-(d) are demonstrated in FIG. 10, showing the elimination of known elements that have been identified as not matching the validated element. 1000 shows the division of a validated but unidentified element into segments. 1001 shows the comparison of a first segment (?) to the respective segments of the known elements stored within the scanning device. 1002 shows the remaining elements, which have passed the comparison, being used in the next stage wherein the next segment in the sequence is compared. After this step, a single element is remaining (9) and hence the validated but unidentified element is now known to be element 9.

It will of course be appreciated that the means of comparison could be any of the well-known image recognition methods, e.g. direct image comparison, edge-finding, divide-and-conquer, greyscale matching, gradient matching, histograms of receptive field responses etc.

Encoding of Data

As discussed above, any form of data may be encoded utilizing the present invention. To do so, the unique characters required to represent the entirety of the data must be identified. For example, to store "1234321", four unique characters are required: 1, 2, 3 and 4. Hence, four unique elements must be generated, in accordance to the specification, wherein each element is assigned to a unique character. Having done this, there now exists an equivalent set of elements to represent the entirety of the data.

Implementation of Scanned Code

The present invention encodes arbitrary information into an optically readable format, dependent on the scanning device used; a same SmartGlyph could be read in innumerable ways dependent on the configuration of the scanning device.

In a preferred example, the SmartGlyph is used to encode numbers in base 10, each element being assigned a unique digit. The entire number, once read, is used to centrally lookup the data assigned to that SmartGlyph which is then transferred back to the scanning device. An example of this process is shown in FIG. 11.

In detail, FIG. 11 shows the steps of, optically capturing 1101 the SmartGlyph 1108, decoding 1102, on the capturing device 1106, the SmartGlyph into a vector. A vector in this case is used as an identifier of the active data stored on the central server 1107. The vector is then sent 1103 to the central server 1107 via any suitable network. The central server 1107 then uses the vector to lookup the associated active data 704. The active data is then transferred 1105 to the capturing device 1106 for presentation to the user.

Further, as the SmartGlyph code is interpreted by the scanning device, a number of options present themselves. For example, it would be possible to embed a control byte into the SmartGlyph, to indicate the type of active data associated with the scanned SmartGlyph. In an example, type 1 may indicate that the Smartglyph is a business card. Therefore, when the scanning device captures the SmartGlyph, a control byte, stored in the SmartGlyph, indicates to the scanning device that the active data is a "business card" type data. The scanning device is then able to open the appropriate application on the scanning device, prior to receiving any active data from the central servers.

The invention claimed is:

1. A method of authenticating a user with a service, having the steps of:
  receiving with a host server a request for a unique code from the service over a first secure communication channel in response to the user requesting a session with the service on a first device, wherein the first device has previously been registered with the host server, and wherein the request for a unique code contains no registration credentials;
  generating with the host server the unique code and associating the unique code with a session-identifier, the session-identifier containing information relating to the code request;
  sending the unique code without the session-identifier from the host server to the service over the first secure communication channel, such that the unique code is presented to the first device by the service;
  the host server receiving from a verification application running on the first device the unique code and device-identifying information of the first device acquired by the verification application over a second secure communication channel;
  the host server using:
    the received unique code to retrieve the session-identifier, and
    the device-identifying information to retrieve associated user-identifying information stored on the host server;
  when the user is previously known to the service based on the user-identifying information received by the service from the host server, the host server sending the retrieved user-identifying information to the service over the first secure communication channel, such that the user is authenticated and granted the request for a session on the first device by the server and the first device receives data from the service as part of the session.

2. The method of claim 1 wherein the session-identifier contains information identifying the service which requested the unique code.

3. The method of claim 1 wherein the session-identifier additionally contains information identifying the request for a session with the service.

4. The method of claim 1 wherein the user-identifying information associated with the device includes at least one of, a username, a password, a date of birth, an address, a telephone number, a host server specific username, a host server specific password, a service specific username, a service specific password.

5. The method of claim 1 wherein when the user is not previously known to the service:
the host server receives from the service a request for additional user-identifying information; and
the host server sends the requested additional user identifying information to the service.

6. The method of claim 5 wherein the service uses the additional user-identifying information to register the user with the service.

7. The method of claim 5 wherein the additional user-identifying information is selected by the user.

8. The method of claim 1 wherein the unique code is a unique locator code for use in a look-up table of the host server.

9. The method of claim 1 wherein the device-identifying information contains a unique device-identifying code in a same format to the unique code.

10. The method of claim 1 wherein the device-identifying information contains a MAC address or similar hardware identifying information of the first device.

11. The method of claim 1 wherein the user requests a session with the service by navigating to a webpage of the service on the first device.

12. The method of claim 1 wherein the first device is known to the host server in that a MAC address or similar device-identifying information is stored on the host server, the device-identifying information being associated with user-identifying information.

13. The method of claim 1 wherein the session-identifier remains local to the host server's network at all times.

14. The method of claim 1 wherein the unique code is presented to the user on a screen of the device.

15. The method of claim 1 wherein acquisition of the unique code is initiated through the user selecting the code on the screen of the device.

16. The method of claim 1, wherein the method is used for authenticating a user prior to using a method of authorizing a transaction.

17. The method of claim 16 wherein the method of authorizing the transaction has the steps of:
the host server opening a communications channel with a payment merchant and receiving from the payment merchant details of the user's transaction received by the payment merchant from the service;
the host server opening a communications channel with the first device, and sending the details of the user's transaction to the first device;
the host server receiving an authorization from the first device when the user verifies that the details of the transaction are accurate;
the host server sending the authorization to the payment merchant, such that the payment merchant authorizes the transaction.

18. The method of claim 1 wherein the unique code is formed of an array of equal-area elements, each element being the smallest representation of a data value, wherein each element is one of the following types of element:
a first type wherein the entire area of the element is a single colour; and
a second type wherein the area is divided into two colours, each colour filling 50% of the element,
wherein the array is a plurality of the second type of element.

19. The method of claim 18, wherein:
at least one of the plurality of the second type of element comprises a diagonal line; or
the at least one of the plurality of the second type of element comprises a line running from one side to an opposing side.

* * * * *